United States Patent
Lamourette et al.

(10) Patent No.: US 11,254,438 B2
(45) Date of Patent: Feb. 22, 2022

(54) VESSEL FOR ENCLOSING AT LEAST ONE SENSOR WITHIN A FUEL TANK

(71) Applicant: Safran Aerotechnics, Plaisir (FR)

(72) Inventors: Daniel Lamourette, Grandchamp (FR); Julien Delrieu, Le Chesnay (FR)

(73) Assignee: SAFRAN AEROTECHNICS, Plaisir (FR)

( * ) Notice: Subject to any disclaimer, the term of this patent is extended or adjusted under 35 U.S.C. 154(b) by 418 days.

(21) Appl. No.: 16/305,840

(22) PCT Filed: Jun. 28, 2016

(86) PCT No.: PCT/IB2016/001080
§ 371 (c)(1),
(2) Date: Nov. 29, 2018

(87) PCT Pub. No.: WO2018/002682
PCT Pub. Date: Jan. 4, 2018

(65) Prior Publication Data
US 2019/0176999 A1    Jun. 13, 2019

(51) Int. Cl.
*B64D 37/00* (2006.01)
*G01F 1/86* (2006.01)
*B64D 37/02* (2006.01)

(52) U.S. Cl.
CPC .......... *B64D 37/005* (2013.01); *B64D 37/02* (2013.01); *G01F 1/86* (2013.01)

(58) Field of Classification Search
CPC .............................. B64D 37/005; B64D 37/08
See application file for complete search history.

(56) References Cited

U.S. PATENT DOCUMENTS

| | | | |
|---|---|---|---|
| 2,842,157 A * | 7/1958 | Mosher | G05D 9/02 137/418 |
| 3,402,732 A * | 9/1968 | Hardison | F16K 31/26 137/390 |
| 3,628,758 A * | 12/1971 | Nichols | B65D 90/44 244/135 R |
| 3,693,915 A | 9/1972 | Ulanovsky | |
| 5,345,811 A * | 9/1994 | Alexandrovich, Sr. | G01N 9/002 73/32 A |

(Continued)

FOREIGN PATENT DOCUMENTS

EP    2330393           6/2011
EP    2572919 A1 *      3/2013    ........... B60K 15/035

OTHER PUBLICATIONS

International Patent Application No. PCT/IB2016/001080, International Search Report and Written Opinion, dated Mar. 7, 2017.

*Primary Examiner* — Matthew G Marini
(74) *Attorney, Agent, or Firm* — Kilpatrick Townsend & Stockton LLP

(57) ABSTRACT

A vessel designed for enclosing at least one sensor is arranged within a fuel tank. The vessel is provided with a fuel inlet connected to a refuelling arrangement of the tank, and with through-holes for the fuel to exit the vessel to the tank or to enter the vessel from the tank. It allows that measurement results which are provided by the sensor during a refuelling operation relate to the fuel currently admitted into the tank, separately from the fuel initially contained in the tank before the refuelling operation has started.

12 Claims, 4 Drawing Sheets

(56) References Cited

U.S. PATENT DOCUMENTS

| | | | |
|---|---|---|---|
| 6,830,219 B1* | 12/2004 | Picot | B01D 19/0005 244/121 |
| 2014/0144917 A1* | 5/2014 | Meillat | B64D 37/22 220/567.2 |
| 2019/0077251 A1* | 3/2019 | Kozar | B60K 15/077 |

* cited by examiner

VESSEL FOR ENCLOSING AT LEAST ONE SENSOR WITHIN A FUEL TANK

The invention relates to a vessel for enclosing at least one sensor within a fuel tank. It also relates a fuel tank set and a process for monitoring an on-going refuelling operation.

BACKGROUND OF THE INVENTION

It is necessary to know the fuel quantity which is actually contained in aircraft fuel tanks, in a manner which provides as much accuracy as possible. However, the fuel quantity measurements which are performed on board an aircraft are usually based on liquid level sensing, for example using capacitor probes. Then, assessing the fuel quantity from the liquid level measurements requires that one knows the fuel density.

But it is well known that fuel used for aircraft propulsion may vary, for example in density, in particular because of fuel temperature variations or because of varying the fuel type or composition, or a combination of variations of both the temperature and the fuel type.

A further difficulty arises from the fact that fuel contained at one time in an aircraft fuel tank may not be uniform in density, depending on temperature and fuel type distributions within the tank. Indeed, as an example, fuel remaining in an aircraft which landed not long time ago is still cold, therefore having a density higher than that fuel of same type and composition to be loaded from an external fuel supply system available at ground level. Then, within the aircraft fuel tanks, the fuel remaining from the last flight will form a layer below the fuel newly loaded for refuelling, even if the newly loaded fuel is introduced through diffusors into the tanks, and both remaining and loaded fuel amounts will mix only after an overall thermal balance has occurred. Therefore, fuel level measurements which are carried out during or shortly after the refuelling operation, based on the liquid level sensors within the aircraft fuel tanks, do not lead to accurate assessments of the fuel quantity. Similar difficulty is involved when fuel to be loaded is of a type or composition, and thus of a density, which is different from that of fuel remaining in the aircraft fuel tanks from the last flight.

It is possible to obtain more exact assessments of the fuel quantities by measuring parameters of a fuel amount which is to be transferred into the aircraft fuel tanks before it is actually delivered to the aircraft, namely on the travel between the fuel supply system and the aircraft. At this location, the fuel transferred is constant in temperature, type and composition, and thus constant in density, so that assessment of the fuel quantity transferred can be accurate. Then computations can combine such assessment of the fuel quantity newly transferred with data available from the aircraft about the fuel quantity already on board. But many existing fuel supply systems are not equipped with suitable fuel parameter measurement means separate from the aircraft.

Starting from this situation, one object of the present invention consists in allowing accurate assessment of the fuel quantity which is contained in a fuel tank, despite some fuel newly loaded may be different in density from the fuel already contained in the fuel tank.

Another object of the invention is to measure at least one parameter of a fuel amount which is currently loaded into the fuel tank, without requiring that the fuel supply system is equipped with a fuel parameter sensor.

Still another object of the invention is that a fuel parameter sensor which is used for the fuel being transferred from an external fuel supply system to the fuel tank can also be used later for measuring the fuel contained in the fuel tank.

SUMMARY OF THE INVENTION

For meeting at least one of these objects or others, a first aspect of the present invention proposes a vessel which is adapted for being arranged fixedly within a fuel tank. The vessel is adapted for enclosing at least one sensor which is dedicated for measuring at least one parameter of a fuel amount situated near the sensor within the vessel. The vessel comprises:

- a top surface, a bottom surface and a sidewall which are arranged for limiting a volume internal to the vessel;
- means for fixing the vessel within the fuel tank, with the top and bottom surfaces situated apart from each other along the gravity direction;
- means for fixing the sensor within the volume internal to the vessel, this volume being sized so as to include free space in addition to the sensor, so that the vessel has fuel capacity besides the sensor;
- a set of through-holes comprising at least a first hole arranged through the top surface of the vessel, and a second hole arranged through the bottom surface of the vessel, each through-hole being adapted for fuel to flow from inside of the vessel to outside of the vessel or from outside of the vessel into the vessel, through this through-hole; and
- at least one fuel inlet which is separate from the through-holes, and adapted for admitting fuel into the vessel when this fuel inlet is connected to a refuelling arrangement for tank refuelling.

According to a further feature of the invention, the through-holes are sized so that the vessel is progressively filled with fuel currently admitted through the fuel inlet upon on-going refuelling of the tank, instead of fuel initially contained in the vessel before refuelling has started. In this way, measurement results which are provided by the sensor during refuelling of the tank become representative of the fuel which is currently admitted through the fuel inlet.

In addition, the through-holes are also sized so that fuel contained in the tank outside the vessel but close to this latter and fuel contained within the vessel become identical or mixed after fuel admission has stopped through the fuel inlet, because of fuel flowing through the through-holes. Thus, further measurement results which are provided by the sensor after the refuelling of the tank has stopped become representative of the fuel contained in the tank outside the vessel but close to it.

For improved separation between the sensor measurements which relate to the fuel currently admitted through the fuel inlet, and measurement results which relate to the fuel contained initially in the vessel, fuel currently admitted and fuel initially contained should not mix with one another. To this purpose, each fuel inlet may be arranged preferably so that fuel which is admitted into the vessel through this fuel inlet penetrates the volume internal to the vessel tangentially with respect to the vessel sidewall and close to the vessel top surface. In this way, the flow of the fuel admitted into the vessel is parallel, and pushes the fuel initially contained upwards to the first hole or downwards to the second hole, depending on the density value of the fuel currently admitted compared to that of the fuel initially contained in the vessel. Most preferably, each fuel inlet may be arranged so that, in the volume internal to the vessel and during on-going refuelling of the tank, a horizontal separation zone exists between the fuel currently admitted through the fuel inlet and the fuel initially contained in the vessel before refuelling has started, and this separation zone progressively moves up or down.

Further improvements of the invention may be dedicated to produce full replacement of the fuel initially contained in the vessel by that currently admitted. To this purpose, the top surface of the vessel may be of conical shape with a first cone apex which is located above this top surface. Then, the first through-hole opens into the volume internal to the vessel at this first apex. Similarly, the bottom surface of the vessel may also be of conical shape with a second cone apex which is located below this bottom surface. And then, the second through-hole opens into the volume internal to the vessel at this second apex.

According to a further improvement of the invention, the through-holes may further comprise at least one additional fuel path which connects the volume internal to the vessel close to the bottom surface, to the outside of the vessel at a level close to the top surface. Possibly, the sidewall of the vessel may comprise an inner lateral surface which is connected to the top surface, and an outer lateral surface which is connected to the bottom surface. In such embodiments, the outer lateral surface surrounds the inner lateral surface so that a gap existing between the inner and outer lateral surfaces forms the additional fuel path. Fuel flow from inside to outside of the vessel or conversely may be improved in this way.

A second aspect of the invention proposes a fuel tank set which comprises:
- at least one fuel tank which is provided with a refuelling arrangement for admitting fuel from an external fuel supply system into the fuel tank;
- a vessel according to the first invention aspect, and arranged fixedly within the fuel tank;
- at least one sensor which is fixed within the volume internal to the vessel, and adapted for measuring a fuel parameter; and
- a derivation pipe which connects the refuelling arrangement to the fuel inlet of the vessel, so that part of the fuel admitted from the external fuel supply system into the fuel tank passes through the derivation pipe to the vessel, and fills the volume internal to the vessel during refuelling of the fuel tank.

Such fuel tank set may be designed for being mounted on board an aircraft or a helicopter.

The sensor may comprise at least one among a fuel temperature sensor, a fuel density sensor, a fuel dielectric permittivity sensor, and other appropriate sensors.

Finally, a third aspect of the invention proposes a process for monitoring an on-going refuelling operation of a fuel tank set according to the second invention aspect. Such process comprises:
- after refuelling has started, waiting for a duration corresponding to at least part of the fuel initially contained in the vessel being replaced with fuel as currently loaded into the fuel tank; and
- once fuel parameter measurement results as provided by the sensor have stabilized while refuelling still goes on, assigning these measurement results to the fuel currently loaded; and
- optionally, using at least one fuel parameter measurement result which has been collected during refuelling of the tank and assigned to the fuel as loaded during said refuelling, for computing a total quantity of fuel contained in the tank.

The process may also comprise the following further optional steps:
- after refuelling has stopped, waiting for a duration corresponding to at least part of the fuel contained in the vessel being replaced with fuel as currently surrounding the vessel within the tank; and
- once fuel parameter measurement results as provided by the sensor have stabilized, assigning the measurement results to the fuel surrounding the vessel within the tank.

These and other features of the invention will be now described with reference to the appended figures, which relate to preferred but not-limiting embodiments of the invention.

BRIEF DESCRIPTION OF THE DRAWINGS

For clarity sake, element sizes which appear in these figures do not correspond to actual dimensions or dimension ratios. Also, same reference signs which are indicated in different ones of these figures denote identical elements of elements with identical function.

DETAILED DESCRIPTION OF THE INVENTION

Figure 1:
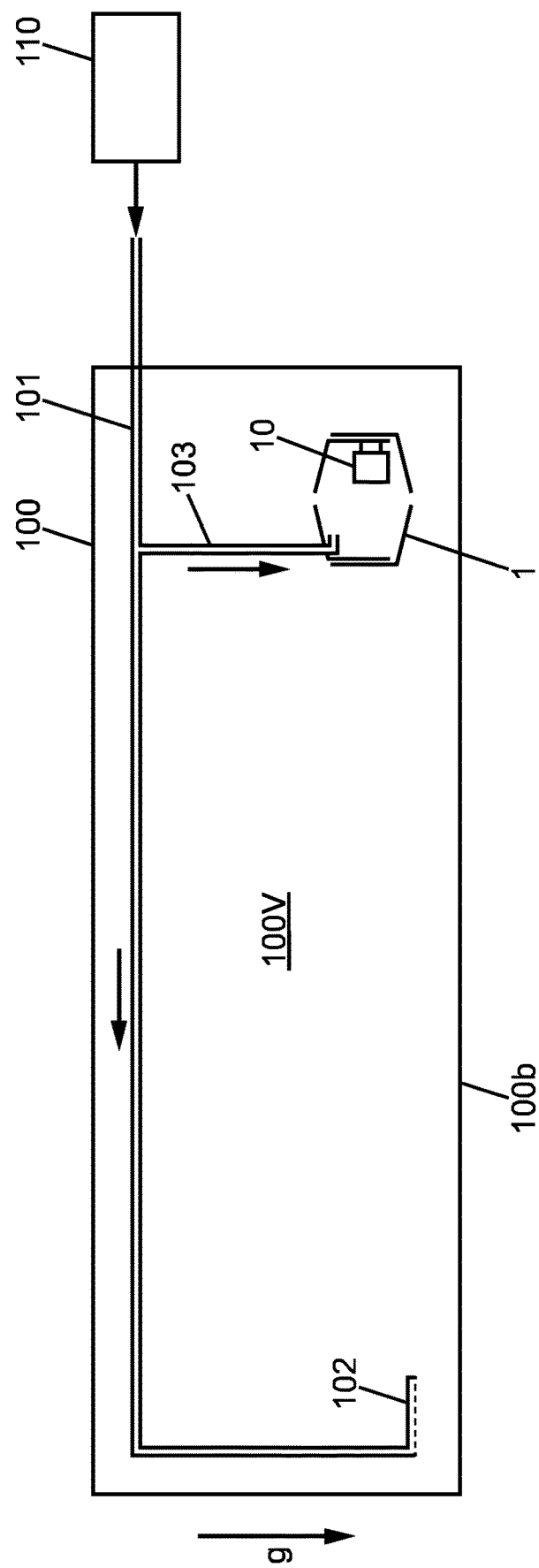
FIG. 1 is a cross-sectional view of a fuel tank set according to the invention.

According to FIG. 1, a fuel tank set according to the invention comprises a fuel tank 100, a refuelling arrangement, a derivation pipe 103, a vessel 1 and at least one fuel parameter sensor 10. The refuelling arrangement is dedicated for being connected to an external fuel supply system 110, temporarily for refuelling operation. The external fuel supply system 110 may be for example a fuel tank truck or an airport fuel delivery network. The refuelling arrangement comprises a refuel line 101 which leads to a diffusor 102, this latter usually located near a bottom 100b of the tank 100. The derivation pipe 103 connects the refuel line 101 upstream the diffusor 102, and leads to a fuel inlet which is located inside the vessel 1. In this way, fuel is admitted into the tank 100 through both the diffusor 102 and the vessel 1. The sensor 10 is fixed within the vessel 1 so as to measure a parameter of the fuel which is contained in the vessel 1 at the time of each measurement.

The fuel tank set of FIG. 1 may be on board an aircraft. The fuel may be of any type available for aircraft propulsion. Then, the fuel density varies depending on the fuel type. For example, fuel density is 0.775 to 0.840 for fuel JET A1, and 0.751 to 0.802 for fuel JP4, both at 15° C. The implementation of the invention vessel 1 is based on such variations of the fuel density, namely a density difference existing between a fuel amount which is currently loaded during an on-going refuelling operation of the tank 100 and a fuel quantity which was already contained in the tank 100 before the refuelling operation has started. The density difference may also be due to a temperature difference existing between the fuel amount currently loaded and the fuel already contained, for example a cold fuel quantity remaining from the last flight of the aircraft.

The vessel 1 is also preferably located within the tank 100 near the tank bottom 100b. Reference sign 100V denotes the internal volume of the tank 100, but outside the vessel 1.

The sensor 10 is dedicated to measure at least one fuel parameter, for example its temperature, density, dielectric constant, also called dielectric permittivity value, etc.

Referring now to FIGS. 2-5, the vessel 1 comprises a top surface 2, a bottom surface 3 and a sidewall 4 which enclose a volume 1V internal to the vessel 1. The internal volume 1V is sized so as to contain a fuel capacity in addition to the sensor 10. This fuel capacity may be about 1 to 2 litres for example.

The top surface 2 is preferably of conical shape with cone apex upwards. The general orientation of the vessel 1 is determined with respect to a gravity-oriented vertical direction, as shown on the figures and denoted g. The top surface 2 is provided with a through-hole 20, called first hole in the general part of the description. The conical shape of the top surface 2 with the through-hole 20 ensures that no amount of light fuel be trapped in the vessel 1 during refuelling.

The bottom surface 3 is also preferably of conical shape but with cone apex downwards. The bottom surface 3 is provided with another through-hole, which is labelled 30 and has been called second hole in the general part of the description. The conical shape of the bottom surface 3 with the through-hole 30 ensures that no amount of heavy fuel be trapped in the vessel 1 during refuelling.

According to a preferred embodiment of the invention, the sidewall 4 of the vessel 1 may comprise two lateral surfaces 4a and 4b, substantially vertical and parallel to each other. The lateral surface 4a, also called inner lateral surface, is connected at its upper edge to the peripheral edge of the top surface 2, and the lateral surface 4b, also called outer lateral surface, is connected at its lower edge to the peripheral edge of the bottom surface 3. Both lateral surfaces 4a and 4b are spaced apart from one another with the lateral surface 4b surrounding the lateral surface 4a so as to form an additional fuel path 40 between the lateral surfaces 4a and 4b. This additional fuel path 40 connects the internal volume 1V close to the bottom surface 3 to the volume 100V of the tank 100 outside the vessel 1 but close to the top face 2. To this end, the lateral surface 4b is arranged externally to the lateral surface 4a. Each one of the through-holes 20 and 30 and the additional fuel path 40 allows free flow of the fuel through it.

A fuel inlet 50 is connected to the derivation pipe 103, and arranged so that part of the fuel which is loaded upon refuelling of the tank 100 is introduced into the volume 1V internal to the vessel 1, and may thereafter flow into the volume 100V of the tank 100 outside the vessel 1, by flowing through at least one among the through-holes 20 and 30 and the additional fuel path 40. Preferably, the fuel inlet 50 is oriented so as to lead the stream of admitted fuel close to and parallel to the sidewall 4, and preferably with a substantially horizontal stream direction. The fuel inlet 50 is also located preferably close to the top surface 2 since this allows avoiding that light fuel currently admitted through the fuel inlet 50 mix with heavier fuel already contained in the vessel 1, due to the light fuel being less viscous than the heavier one.

In FIGS. 2-5, FS denotes a separation zone between the fuel which is currently admitted into the vessel 1 through the fuel inlet 50 during a refuelling operation, and the fuel which was already contained in the vessel 1 before the refuelling operation has started. Although the fuel separation zone FS is represented as a horizontal intermediate layer of reduced thickness, it may actually be thicker corresponding to a volume segment in which both fuel liquids are mixed with non-uniform proportions. But such intermediate layer is supposed to be thin enough with respect to the internal height of the vessel 1. In any circumstance, that part of the fuel which has higher density value between the fuel which is currently admitted and the fuel already contained in the vessel 1, accumulates or is located below the fuel separation zone FS, and the other part of the fuel which is lower in density value accumulates or is located above the fuel separation zone FS.

Figure 2:
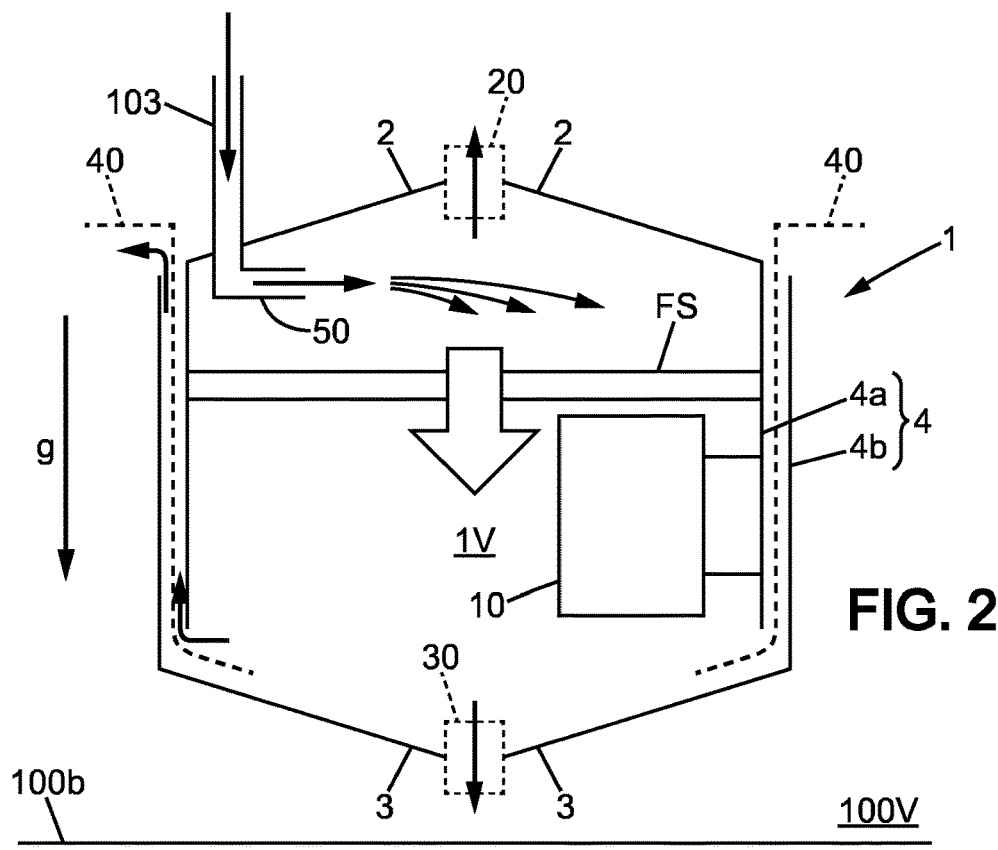
FIGS. 2 to 5 show fuel flows during (FIGS. 2 and 4) and after (FIGS. 3 and 5) a refuelling operation for both cases of fuel currently loaded being lower (FIGS. 2 and 3) or higher (FIGS. 4 and 5) in density than fuel initially contained in the fuel tank.

FIG. 2 illustrates the moving of the fuel separation zone FS upon refuelling when the fuel currently admitted into the vessel 1 through the fuel inlet 50 is lower in density than that already contained in the vessel 1 before refuelling has started. The vessel 1 may be thus initially full with heavier fuel. The amount of light fuel which is contained in the vessel 1 increases over time during refuelling, although some of the light fuel leaks through the through-hole 20 (see arrow at this location). Therefore the fuel separation zone FS moves downwards as indicated in FIG. 2, while heavier fuel initially contained in the vessel 1 before refuelling has started escapes through the through-hole 30 and also possibly through the additional fuel path 40 (see arrows at these locations). The light fuel admitted through the fuel inlet 50 starts rotating along the inner lateral surface 4a and then accumulates above the fuel separation zone FS, pushing this latter downwards. This continues until the fuel separation zone FS reaches the through-hole 30 and the internal volume 1V of the vessel 1 is then completely filled with light fuel.

Figure 3:
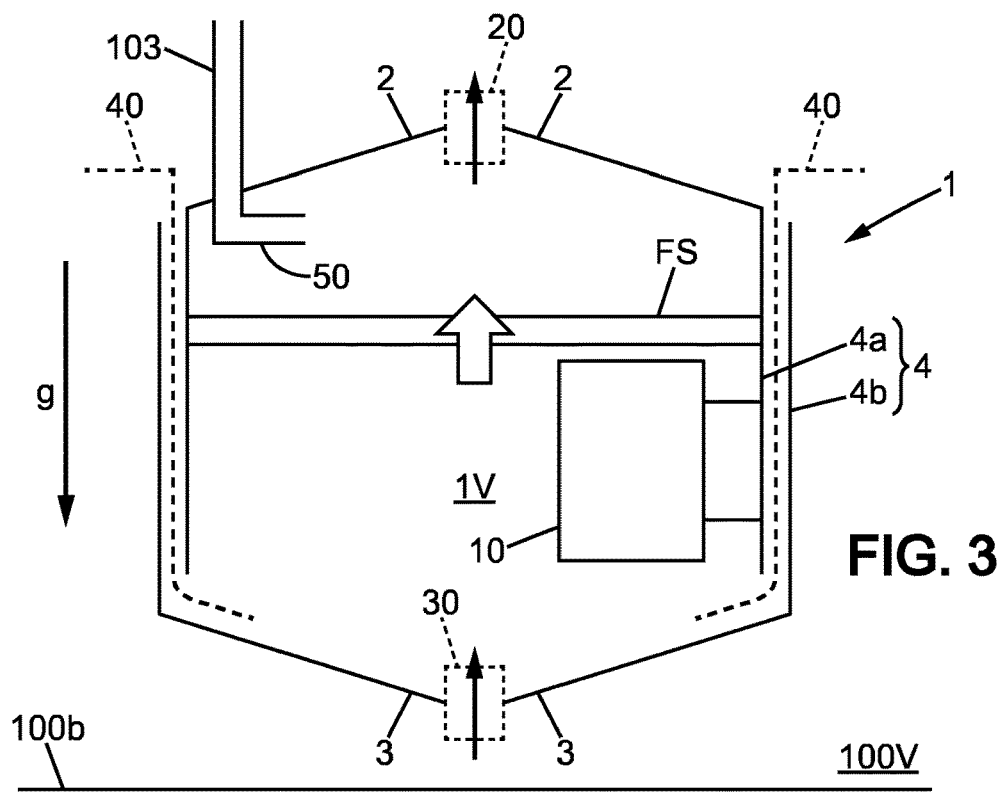

Starting from this situation, FIG. 3 illustrates the evolution after the refuelling has been stopped (see arrows in FIG. 3), corresponding to relaxation flow. The vessel 1 is then surrounded within the tank 100 with fuel which is heavier than that which is enclosed in the vessel 1. Then this heavy fuel penetrates through the through-hole 30 into the vessel 1, and also possibly through the additional fuel path 40, from outside of the vessel 1 to inside of it, while the light fuel escapes through the through-hole 20. Then the fuel separation zone FS moves back upwards.

Figure 6:
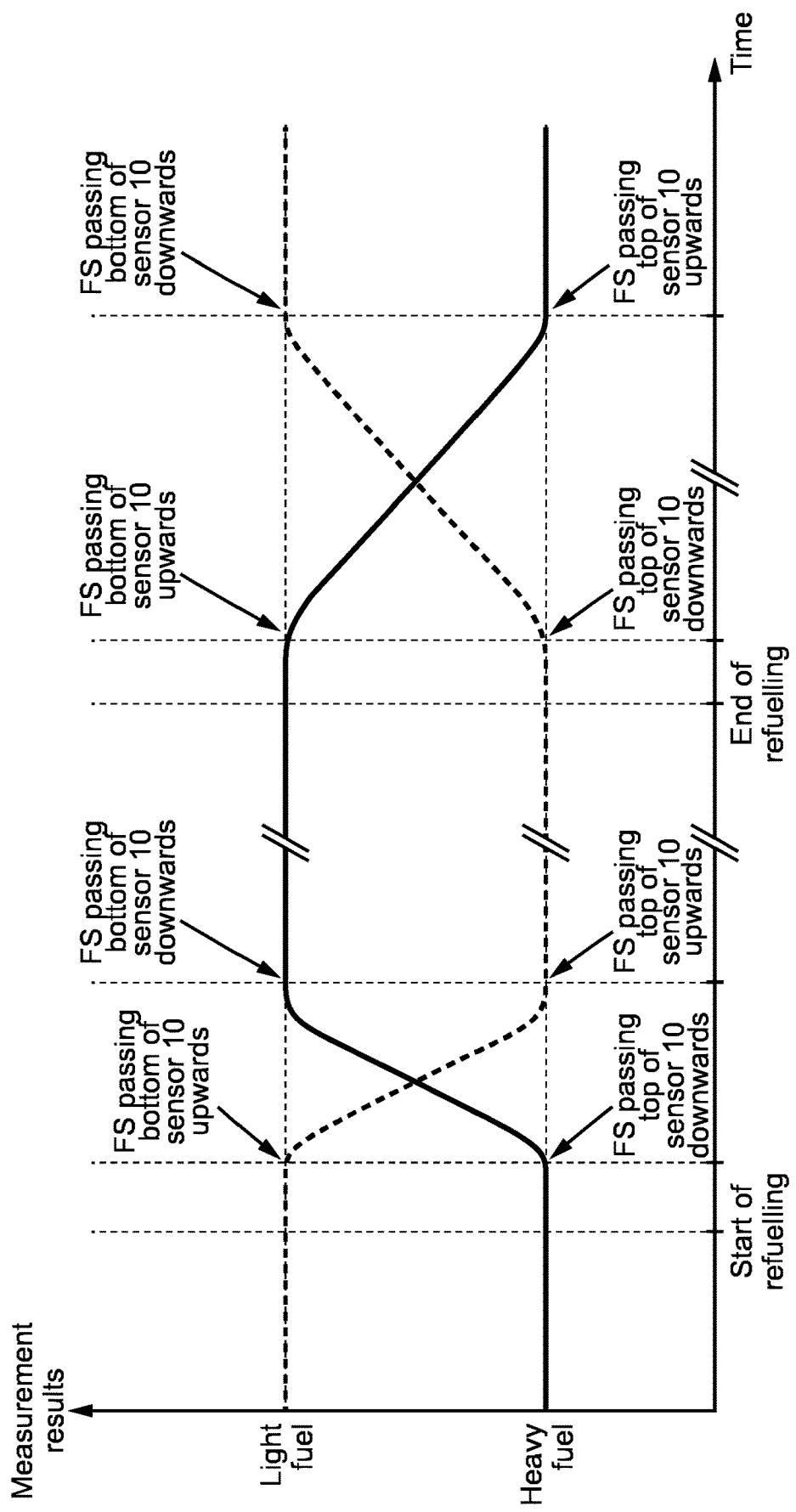
FIG. 6 is a time-diagram of a measured fuel parameter for a fuel tank set according to the invention.

Continuous line in the time-diagram of FIG. 6 illustrates the variations of the results for the fuel parameter which are outputted by the sensor 10, for the sequence just described with reference to FIGS. 2 and 3. X-axis indicates time and Y-axis indicates the fuel portion which is concerned by each measurement result. Result transitions correspond to time periods during which the fuel separation zone FS moves in front of the measurement window of the sensor 10. Final fuel composition inside the vessel 1 is identical to that initially existing outside the vessel 1 and corresponds in present case to the initially contained heavy fuel.

Figure 4:
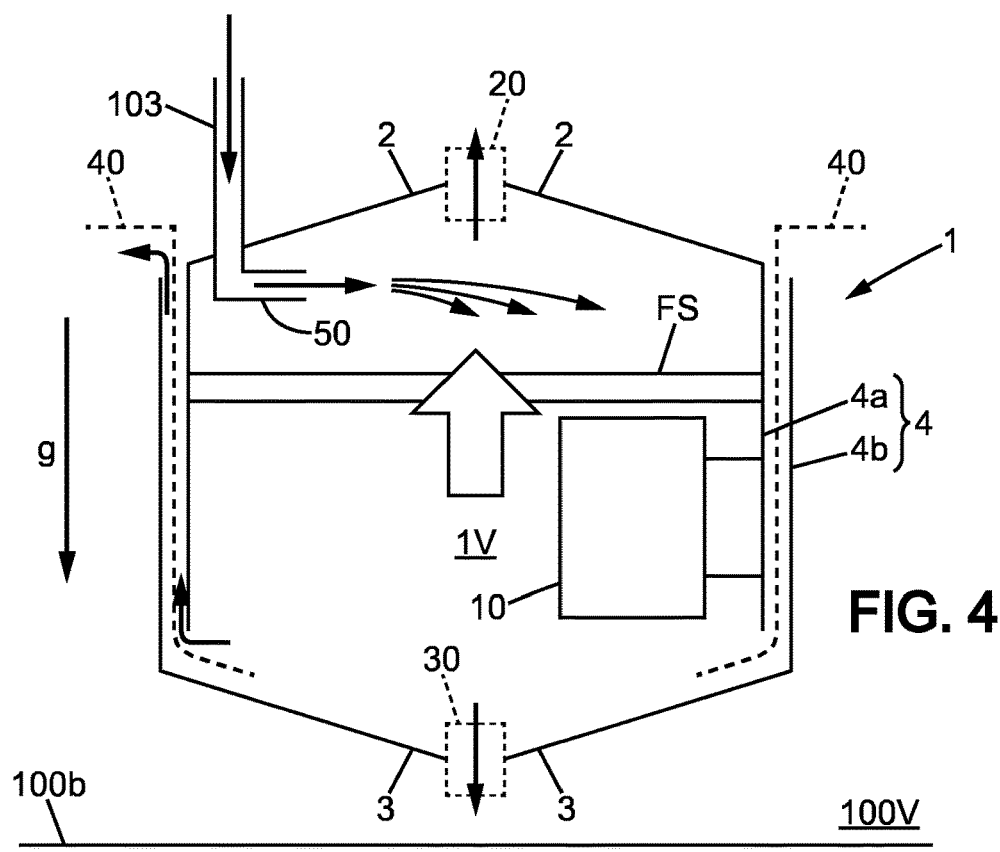

FIG. 4 corresponds to FIG. 2 but with the fuel currently admitted into the vessel 1 through the fuel inlet 50 being heavier than that already contained in the vessel 1 before refuelling has started. The vessel 1 is thus initially full with light fuel. The amount of heavy fuel which is contained in the vessel 1 increases over time during refuelling, although some of this heavy fuel leaks through the through-hole 30 (see arrow at this location). Therefore the fuel separation zone FS moves upwards as indicated in FIG. 4, while light fuel initially contained in the vessel 1 before refuelling escapes through the through-hole 20 (see arrow at this location). The heavy fuel admitted through the fuel inlet 50 starts rotating along the lateral surface 4a, then flows down to the fuel separation zone FS and accumulates below this latter so that the fuel separation zone FS rises. This continues until the fuel separation zone FS reaches the through-hole 20, and the internal volume 1V of the vessel 1 is then completely filled with heavy fuel.

Figure 5:
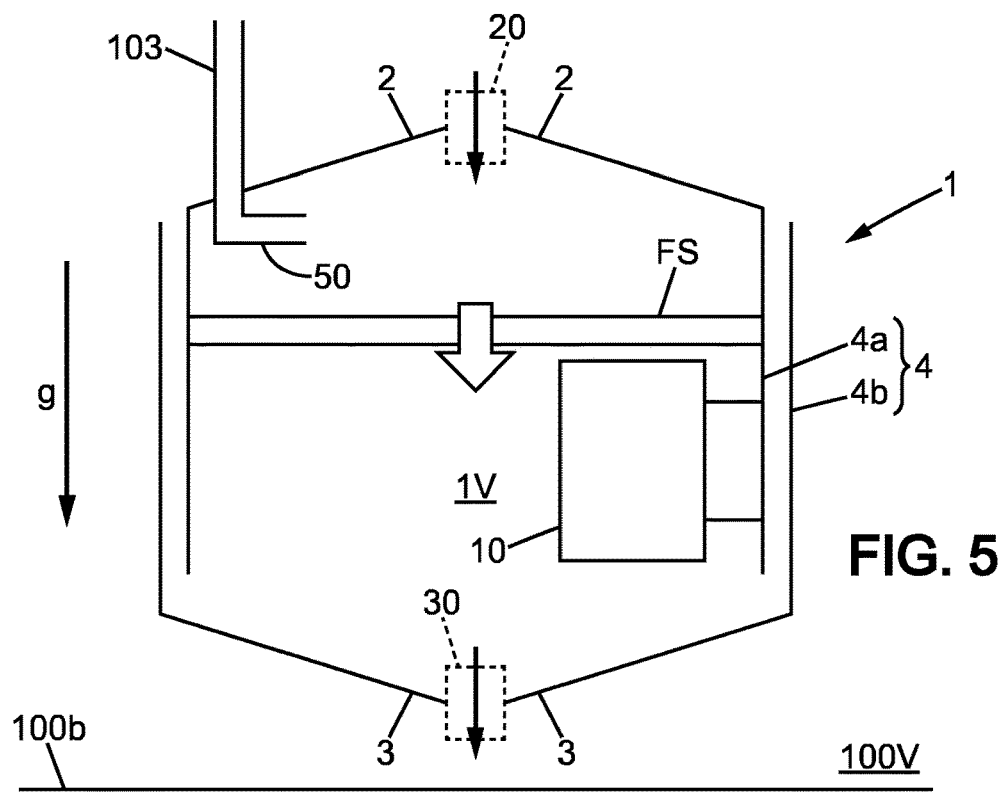

Starting from this last situation, FIG. 5 illustrates the relaxation evolution after the refuelling has been stopped (see arrows in FIG. 5). If the vessel 1 is then surrounded within the tank 100 with fuel which is lighter than that which is enclosed in the vessel 1, because the refuelling has not been sufficient for submerging the vessel 1 with heavy fuel, then the heavy fuel contained in the vessel 1 escapes through the through-hole 30 while light fuel penetrates through the through-hole 20 into the vessel 1. Thus the fuel separation zone FS moves back downwards.

Broken line in the time-diagram of FIG. 6 illustrates again the variations of the results which are outputted by the sensor 10 for the fuel parameter, but for the sequence described with reference to FIGS. 4 and 5. Reasoning is similar to that already described for the case of light fuel newly added.

So for both cases of the density comparison, fuel injection through the fuel inlet 50 causes temporary shift of the fuel separation zone FS. This temporary shift moving in front of the sensor 10 allows obtaining parameter measurement results which relate to the fuel newly loaded during the refuelling operation.

Once the above operations have been explained, the Man skilled in liquid transfer will be able to select easily appropriate values for the diameters of the fuel inlet 50, the through-holes 20 and 30 as well as a total cross-sectional area for the additional fuel path 40, based on a prescribed inlet flow. For example, the following values have been implemented by the inventors:

- diameter of the fuel inlet 50: 8 mm (millimetre) for an inlet flow of 3 L/min (liter per minute)
- diameter of the through-hole 20: 4.5 mm for the inlet flow of 3 L/min
- diameter of the through-hole 30: 4.5 mm for the inlet flow of 3 L/min
- cross-sectional area of the additional fuel path 40: to be maximized, for example comprised of 12 holes each of 4.5 mm in diameter
- height of the lateral surfaces 4a and 4b: for example 100 mm, but sufficient for the vessel 1 to enclose the desired sensor(s)
- fuel capacity of the vessel 1 besides the sensor 10: 1.5 L (liter) based on the outer lateral surface 4b.

Once an operator is provided with the fuel parameter value outputted by the sensor 10, relating to the newly added fuel amount, he can obtain the density value of this added fuel amount. Then, this density value can be combined with data relating to the fuel initially contained in the tank 100 before refuelling has started, and also further data obtained after the end of the refueling operation, for calculating the actual fuel amount contained in the tank. This applies in particular when liquid height is measured in the tank 100. The total fuel amount, for example expressed as a fuel mass, can be computed from liquid height data, tank shape data, and density values for the fuel layers which are superposed within the tank, from higher density value to lower density value when moving upwards in the tank. Such computations are well-known from the Man skilled in aircraft operation, so that it is not necessary to explain them again.

Although the invention has been described in details with reference to the figures, secondary aspects of the invention can be modified while maintaining the advantages cited. In particular, values cited above are only for illustrating purpose and may be varied in a great extent.

The invention claimed is:

1. Vessel adapted for being arranged fixedly within a fuel tank, and enclosing at least one sensor, said sensor being dedicated for measuring at least one parameter of a fuel amount situated near the sensor within the vessel, the vessel comprising:
   a top surface, a bottom surface and a sidewall arranged for limiting a volume internal to the vessel;
   wherein the vessel is fixed within the fuel tank, with the top and bottom surfaces situated apart from each other along a gravity direction;
   wherein the sensor is fixed within the volume internal to the vessel, said volume being sized so as to include free space in addition to the sensor, so that the vessel has fuel capacity besides the sensor;
   a set of through-holes comprising at least a first hole arranged through the top surface of the vessel, and a second hole arranged through the bottom surface of said vessel, each through-hole being adapted for fuel to flow from inside of the vessel to outside of the vessel and from outside of said vessel into said vessel, through each said through-hole; and
   at least one fuel inlet separate from the through-holes, and adapted for admitting fuel into the vessel when said fuel inlet is connected to a refuelling arrangement for tank refuelling,
   wherein the through-holes are sized so that the vessel is progressively filled with fuel currently admitted through the fuel inlet upon on-going refuelling of the tank, instead of fuel initially contained in the vessel before refuelling has started, whereby measurement results provided by the sensor during refuelling of the tank become representative of said fuel currently admitted through the fuel inlet,
   and so that fuel contained in the tank outside but around the vessel and fuel contained within the vessel become identical or mixed after fuel admission has stopped through the fuel inlet, because of fuel flowing through the through-holes, whereby measurement results provided by the sensor after the refuelling of the tank has stopped become representative of said fuel contained in the tank outside the vessel but close to said vessel.

2. Vessel according to claim 1, wherein each fuel inlet is arranged so that fuel admitted into the vessel through said fuel inlet penetrates the volume internal to the vessel tangentially with respect to the vessel sidewall and close to the vessel top surface.

3. Vessel according to claim 2, wherein each fuel inlet is arranged so that, in the volume internal to the vessel and during on-going refuelling of the tank, a horizontal separation zone exists between the fuel currently admitted through the fuel inlet and the fuel initially contained in the vessel before refuelling has started, and said separation zone progressively moves up or down.

4. Vessel according to claim 1, wherein the top surface is of conical shape with a first cone apex located above said top surface, and the first through-hole opens into the volume internal to the vessel at said first apex.

5. Vessel according to claim 1, wherein the bottom surface is of conical shape with a second cone apex located below said bottom surface, and the second through-hole opens into the volume internal to the vessel at said second apex.

6. Vessel according to claim 1, wherein the through-holes further comprise at least one additional fuel path connecting the volume internal to the vessel close to the bottom surface, to the outside of the vessel at a level close to the top surface.

7. Vessel according to claim 6, wherein the sidewall comprises an inner lateral surface connected to the top surface, and an outer lateral surface connected to the bottom surface, and the outer lateral surface surrounds the inner lateral surface so that a gap existing between said inner and outer lateral surfaces forms the additional fuel path.

8. Fuel tank set comprising:
- at least one fuel tank provided with a refuelling arrangement for admitting fuel from an external fuel supply system into the fuel tank;
- a vessel according claim 1, and arranged fixedly within the fuel tank; and
- a derivation pipe connecting the refuelling arrangement to the fuel inlet of the vessel, so that part of the fuel admitted from the external fuel supply system into the fuel tank passes through said derivation pipe to the vessel, and fills the volume internal to the vessel during refuelling of the fuel tank.

9. Fuel tank set according to claim 8, designed for being mounted on board an aircraft or a helicopter.

10. Fuel tank set according to claim 8, wherein the sensor comprises at least one among a fuel temperature sensor, a fuel density sensor and a fuel dielectric permittivity sensor.

11. Process for monitoring an on-going refuelling operation of a fuel tank set according to claim 8, said process comprising:
- after refuelling has started, waiting for a duration corresponding to at least part of the fuel initially contained in the vessel being replaced with fuel as currently loaded into the fuel tank; and
- once fuel parameter measurement results as provided by the sensor have stabilized while refuelling still goes on, assigning said measurement results to the fuel currently loaded.

12. Process according to claim 11, further comprising:
- using at least one fuel parameter measurement result collected during refuelling of the tank and assigned to the fuel as loaded during said refuelling, for computing a total quantity of fuel contained in the tank.

* * * * *